United States Patent
Wild

(10) Patent No.: US 6,322,176 B1
(45) Date of Patent: Nov. 27, 2001

(54) TRANSMISSION MEDIA PATCH PANEL MODULAR CABINETRY SYSTEM

(75) Inventor: Ronald L. Wild, Carmel, IN (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/222,608

(22) Filed: Dec. 29, 1998

(51) Int. Cl.[7] ............................................. A47B 97/00
(52) U.S. Cl. .................... 312/223.6; 108/50.02; 52/220.7
(58) Field of Search ............... 312/223.6, 223.1, 312/223.3; 108/50.01, 50.02; 52/220.7, 220.3, 220.1

(56) References Cited

U.S. PATENT DOCUMENTS

| | | | |
|---|---|---|---|
| 5,487,246 | * 1/1996 | Hodges et al. | 52/220.7 |
| 5,784,841 | * 7/1998 | Nowell | 52/220.7 X |
| 5,822,935 | * 10/1998 | Mitchell et al. | 52/220.7 X |
| 5,833,332 | * 11/1998 | Marshall et al. | 312/223.6 X |
| 5,918,433 | * 7/1999 | Reuter et al. | 52/220.7 |
| 5,953,871 | * 9/1999 | MacConnell et al. | 52/220.7 X |
| 5,969,292 | * 10/1999 | Snider, Jr. et al. | 52/220.7 X |
| 5,994,644 | * 11/1999 | Rindoks et al. | 108/50.02 X |
| 6,003,273 | * 12/1999 | Elsholz et al. | 52/220.7 |
| 6,135,583 | * 10/2000 | Simon et al. | 108/50.02 X |

* cited by examiner

Primary Examiner—Peter M. Cuomo
Assistant Examiner—Hanh V. Tran
(74) Attorney, Agent, or Firm—Thomas, Kayden, Horstemeyer & Risley, LLP

(57) ABSTRACT

A transmission media patch panel modular cabinetry system for interconnecting transmission media includes at least one patch panel having a plurality of jacks mounted thereto with each of the jacks being configured to mate with a patch cord. First and second closet modules are attached to at least one of the patch panels. Each of the closet modules preferably incorporate an upright, a raceway, and an access channel, with each of the raceways formed adjacent at least one of the patch panels. The access channels, which are formed between the uprights, and the raceways are sized and shaped to pass transmission media therethrough. Doors for selectively providing access to the raceways also can be provided.

12 Claims, 7 Drawing Sheets

TRANSMISSION MEDIA PATCH PANEL MODULAR CABINETRY SYSTEM

BACKGROUND OF THE INVENTION

1. Field of the Invention

The present invention relates to patch panels for communications use and, more particularly, to modular cabinetry for mounting patch panels thereto.

2. Description of the Related Art

In buildings and, more particularly, within communications connection closets in buildings, various transmission media typically are connected to each other and to incoming and outgoing lines by means, such as connectors, which are mounted to patch panels. Patch panels generally are mounted within a communications closet, such as to a wall or other mounting surface, and incorporate a series of connectors for interconnecting the various transmission media. Transmission media, such as copper wires formed into patch cord cordage, for instance, often incorporate plugs at their ends that are configured for mating with, for example, the plug-receiving cavities of jacks, which commonly serve as patch panel mounted connectors.

Once a patch cord plug is inserted into the plug-receiving cavity of a jack, the cordage of the patch cord typically extends away from the patch panel jack and tends to hang downwardly in front of the patch panel. When carefully dressed, these cords appear neat and orderly and can facilitate efficient patching efforts by a technician, because the patch cords and their associated jacks are readily accessible. However, when the patch cords are not carefully dressed, a general appearance of disorder can result as the cordage of the patch cords inherently tend to form loops in front of the patch panel. In extreme cases, the patch cords may become entangled or snarled with adjacent cords, thereby potentially hindering a technician's patching efforts.

In an effort to minimize the tendency of patch cords to snarl or become entangled with adjacent cords, technicians attempt to select patch cords for use in a patch panel that have a proper length, e.g. patch cords which, when appropriately connected, present a minimal amount of cordage slack. Oftentimes, when a technician is unable to provide a patch cord of proper length, slack in the patch cord typically is accommodated by meandering the excess cordage in and around the horizontal raceways of the patch panel. This configuration also contributes to a general appearance of disorder of the patch cords and also promotes cordage entanglement.

Therefore, there is a need to provide an improved patch panel which addresses these and other shortcomings of the prior art.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities said first and second closet modules extending above said patch panels with said upper closet module disposed therebetween, said lower closet module laterally extending beyond said patch panels with said first and second closet modules disposed thereabove. and combinations particularly pointed out in the appended claims.

The present invention generally is directed to a transmission media patch panel modular cabinetry system for interconnecting various transmission media. In a preferred embodiment, the patch panel system incorporates at least one patch panel and two or more closet modules mounted to the patch panel. The closet modules provide cordage raceways, formed adjacent the patch panels, that are configured to pass transmission media therethrough. In some embodiments, the raceways are hidden behind doors which selectively provide access to the cordage.

In accordance with another aspect of the present invention, the cabinetry system incorporates a minimal number of components which can be interconnected to form various configurations of patch panel arrays depending on the particular application. For instance, closet modules of the system can be arranged in various configurations, including, but not limited to: side-by-side configurations, which can be wall mounted or freestanding; and back-to-back configurations, which typically are freestanding. Some embodiments also can incorporate upper closet modules disposed above a patch panel, lower closet modules disposed below a patch panel, or both, with the upper and lower modules providing troughs for placing the slack portion of patch cord cordage therein.

In accordance with another aspect of the present invention, closet modules and their associated patch panels can be arranged in arrays of modules with the arrays being spaced from each other. These embodiments typically are freestanding and can incorporate cable cross bridges for supporting transmission media extending between the arrays.

A preferred method aspect of the invention includes the steps of: providing a patch panel with a plurality of jacks mounted thereto, each of the jacks being configured to mate with a patch cord; providing first and second duplicate closet modules, with each of the closet modules incorporating an upright member, each of the upright members including first and second side walls and access channels formed therebetween, with each of the access channels sized and shaped to pass transmission media therethrough; arranging the first and second duplicate closet modules in an upright orientation; attaching the patch panel to the first closet module so that the first side wall of the first closet module engages the patch panel; inverting the second closet module, and; attaching the patch panel to the second closet module so that the first side wall of the second closet module engages the patch panel.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
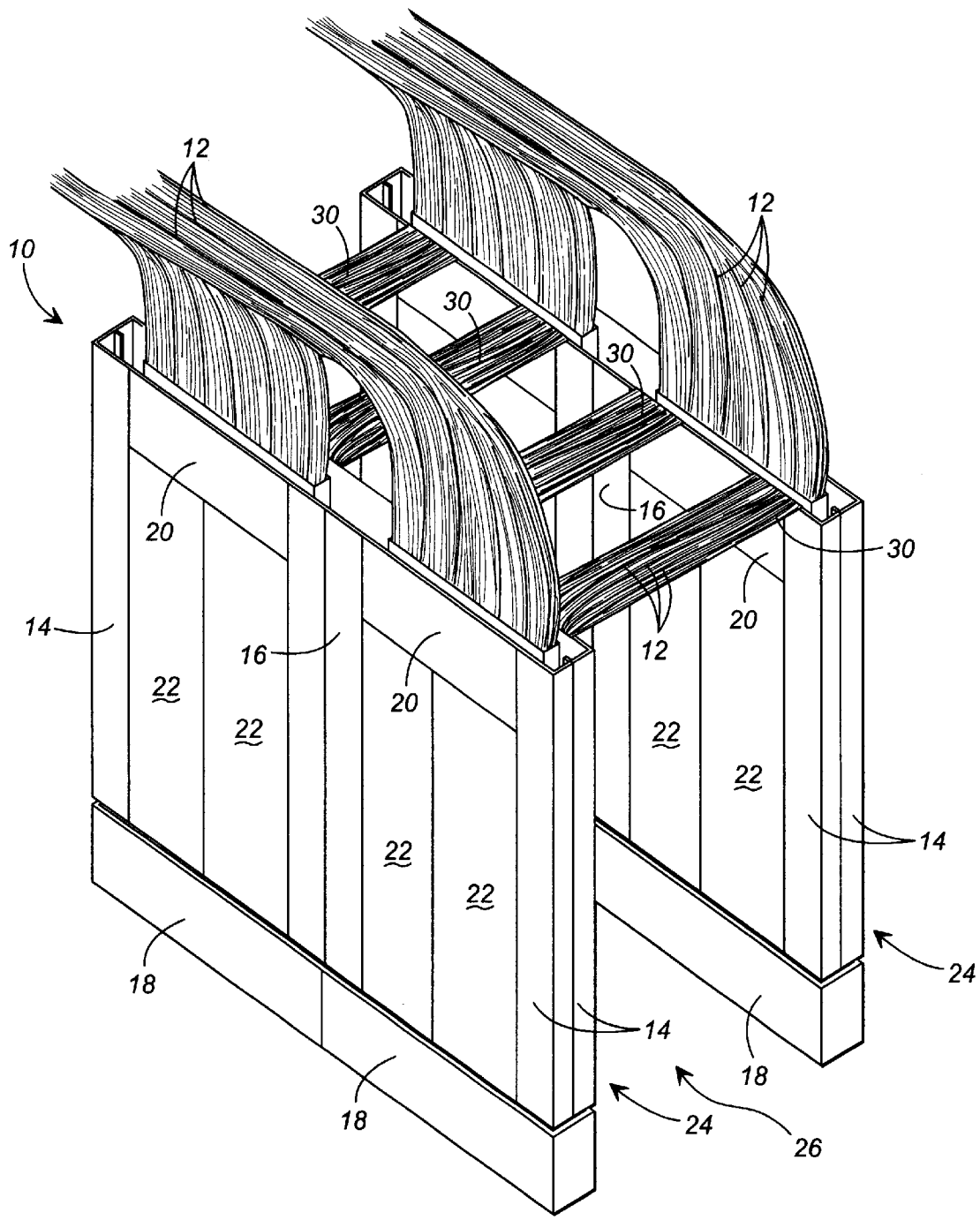
FIG. 1 is a perspective view of a preferred embodiment of the transmission media patch panel modular cabinetry system of the present invention.

Reference will now be made in detail to the description of the invention as illustrated in the drawings, wherein like reference numbers indicate like parts throughout the several views. FIG. 1 depicts a preferred embodiment of the transmission media patch panel modular cabinetry system 10 of the present invention which provides a centralized location for the intersection and interconnection of various transmission media, such as cables 12. The system 10 is formed by a plurality of cabinet modules, including individual or end closet modules 14, dual closet modules 16, lower trough module 18 and upper trough module 20 which interconnect to form various configurations of patch panel arrays. So configured, the system 10 incorporates a minimal number of components, thereby promoting potential cost savings relating to manufacture and implementation of the system. As shown in FIG. 1, modules 14, 16, 18, and 20 can cooperate to form a freestanding framework for mounting patch panels 22 and for encasing the various cords and cables used in association with the patch panels.

A preferred embodiment of the system 10 (FIG. 1) incorporates one or more patch panel arrays 24 with each array including one or more patch panels 22 arranged in side-by-side relationship with one another. Each patch panel incorporates one or more jacks (not shown) which are configured to mate with the plugs of patch cords. When multiple patch panel arrays 24 are utilized for a particular application, the arrays typically are arranged in a spaced relationship, thereby forming a technician walkway 26 between opposing arrays. Additionally, each array 24 can incorporate two or more opposing and outwardly facing patch panels 22, such that each pair of the panels 22 are arranged in a back-to-back orientation. Furthermore, when a plurality of arrays 24 are arranged with a walkway 26 therebetween, one or more cordage cross bridges 30 can be provided. The bridges 30 provide support surfaces for the cordage which span walkway 26 between the arrays so that the arrays may be electrically interconnected. Although the bridges 30 may be arranged at numerous locations, preferred embodiments incorporate the bridges 30 at the upper most portions of the arrays 24, i.e. at the top of upper trough modules 20, so that any cables 12 or cordage extending from one array to an adjacent array across the upper surface of the bridges 30 are placed outside of the walkway 26.

For those embodiments not incorporating the freestanding configuration of FIG. 1, for instance, a single-sided array 24 incorporating patch panels 22 facing in a single direction can be provided for mounting to a mounting surface, such as a wall. The single-sided array 24 is mounted to the mounting surface in a conventional manner, such as by fastening the array to the mounting surface with mechanical fasteners.

Figure 2:
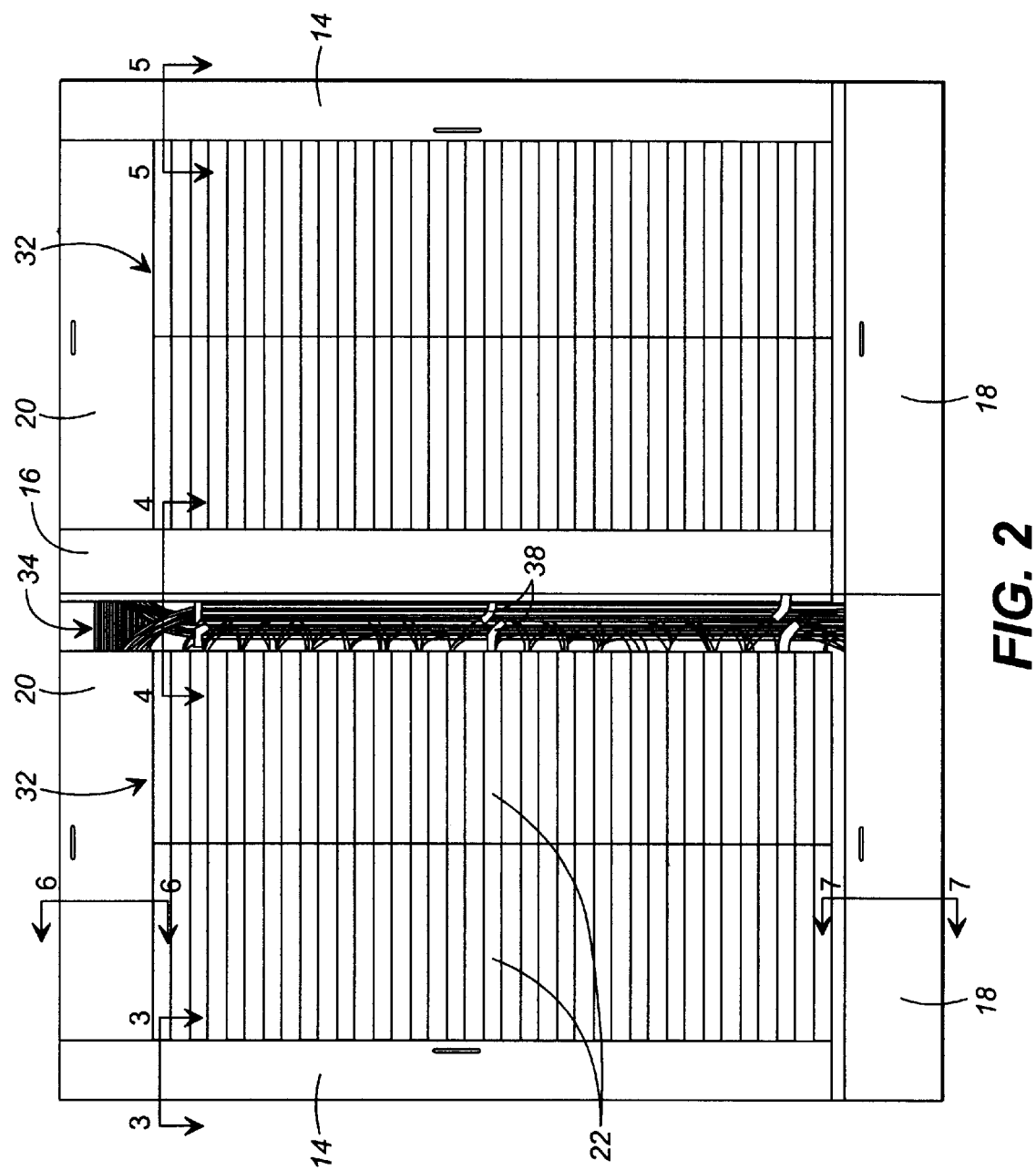
FIG. 2 is a front view of a preferred embodiment of the present invention.

In FIG. 2, a representative portion of an array 24 is shown in order that the modular construction of the array may be described in greater detail. It should be understood, however, that the embodiment of FIG. 2 is representative of both a panel array which is arranged in a freestanding configuration or in a wall mounted configuration, as described hereinbefore. Additionally, although only one array 24 is depicted in FIG. 2, the modular construction of the present invention allows for numerous system configurations, i.e. arrays incorporating more than one dual closet module 16, which are also well within the scope of the invention.

As shown in FIG. 2, each array 24 incorporates one or more panel modules 32. Each panel module 32 incorporates one or more patch panels 22 depending on the particular application, with the panels 22 capable of being arranged in various configurations within the array, such as side-by-side, top-to-bottom, staggered, etc. Each panel module 32 also incorporates at least one closet module 14, and lower and upper trough modules 18 and 20, respectively. Additionally, when two or more panel modules 32 cooperate to form an array 24, a dual closet module 16 typically is disposed between each of the panel modules 32.

As described in greater detail hereinafter, closet modules 14 and 16 each provide a vertical raceway 34 through which patch cords may pass while interconnecting the various panel components. Likewise, the lower and upper trough modules, 18 and 20 respectively, provide horizontal raceways or slack troughs 36 (FIGS. 6 and 7), thereby providing space within the panel system 10 for organizing and, otherwise, hiding the various system cables and cords. Each vertical raceway 34 preferably includes one or more cord restraint brackets 38 for limiting the horizontal movement of cordage within the raceways 34, thereby reducing the tendency of the cordage to snarl or entangle with other cordage within the raceway.

Each of the modules (e.g. 14, 16, 18 and 20) can incorporate a door for providing access to the raceways and troughs and which is hingedly mounted to its respective module. In preferred embodiments, each door is biased to a closed position, such as with a spring tensioner, among others, and is provided with a latch for selectively securing the door in its closed position. Each door preferably incorporates a handle. The aforementioned cord restraint brackets 38 also enable the closing of a module door without damaging a patch cord by preventing the cordage of a patch cord from improperly aligning within the raceway.

Figure 3:
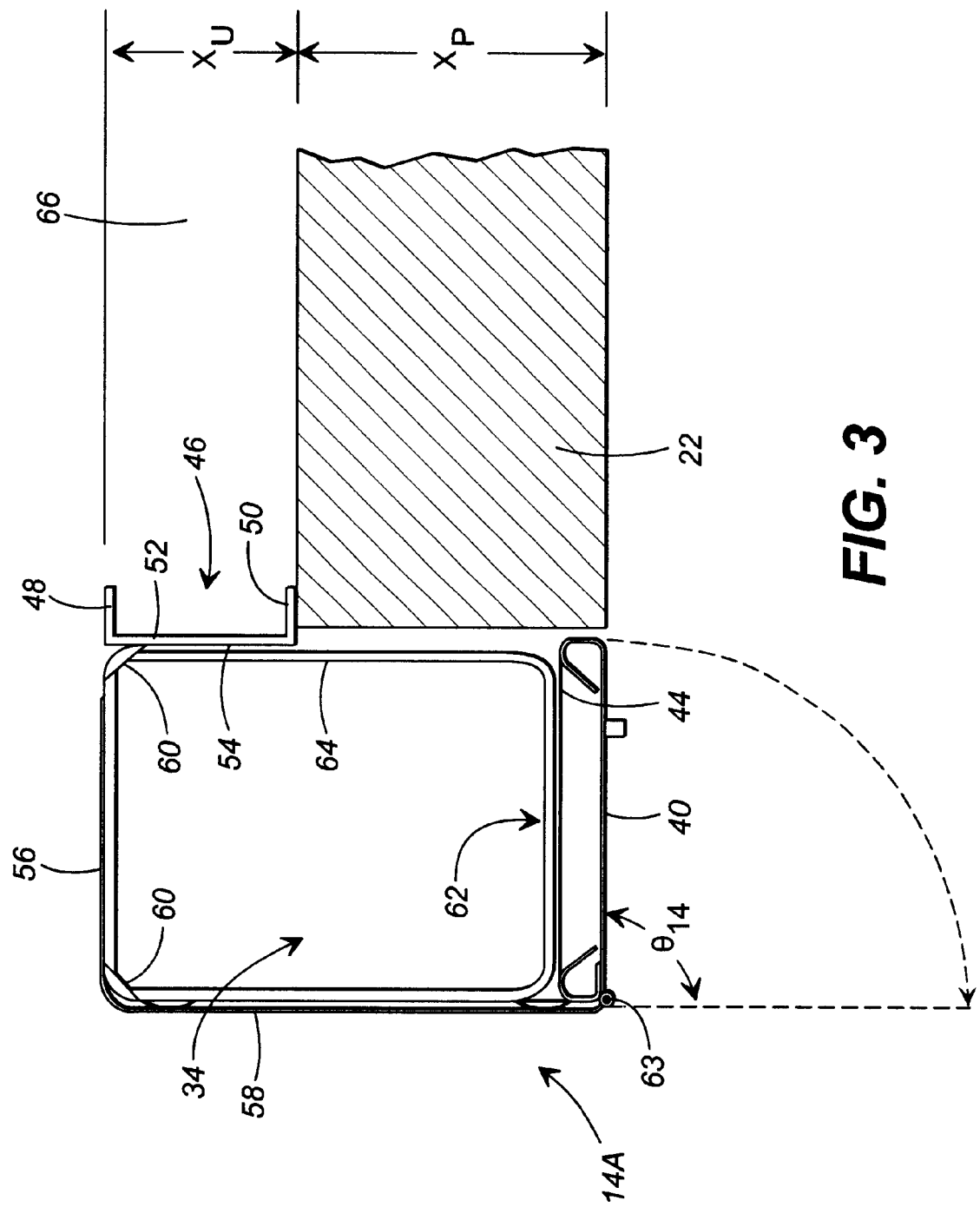
FIG. 3 is a partially cut-away, cross-sectional view of the embodiment of FIG. 2 taken along section line 3—3.

Referring now to FIG. 3, a closet module 14, and in particular, a left hand closet module 14A, will hereinafter be described in detail. The primary structural support component of closet module 14A is upright member 46, preferably a length of C-channel beam formed of steel, aluminum, or other various materials possessing suitable strength characteristics, i.e. a standard free-standing equipment rack, a standard wall-mount equipment rack, etc. Upright 46 includes opposing side walls 48 and 50 which extend outwardly from base 52. When incorporated into a single-sided closet module, side wall 48 are utilized as a mounting member through which fasteners (not shown) such as screws, bolts, etc. are be passed for attaching the closet module to a mounting surface. When, however, closet module 14 is arranged in a free-standing back-to-back configuration with an additional closet module 14, the respective side walls 48 of each closet module are fastened together. Alternatively, a standard double-sided free-standing equipment rack (not shown) can be utilized, such that each of the modules 14 incorporate the standard double-sided free-standing equipment rack as a structural support. Additionally, side wall 50 is attached to one or more patch panels 22 such that the front side of the panel, e.g. the side providing access to the jacks, faces away from the side wall 50.

A vertical raceway 34 is formed within closet module 14 and is defined by a series of walls, e.g. side wall 54, back wall 56, and end wall 58, which cooperate to at least partially encase the raceway. The walls 54, 56 and 58 can be formed as separate members which are joined together in a conventional manner such as by gluing, welding, etc. In the preferred embodiment of FIG. 3, however, the walls are formed from a single piece of sheet material, i.e. sheet metal, which is bent and formed to an appropriate shape. Shaped gussets 60 can be mounted, in some embodiments, at the corner joints of the walls for additional support.

As shown in FIG. 3, access to the raceway 34 is provided by an opening 62 which, in some embodiments, may extend substantially the entire height of the closet module 14. A door 40 also can be provided which normally closes opening 62 and, when opened, selectively provides access to the cables contained therein. The door is formed as a pressed panel typically being constructed of sheet metal; however, numerous other construction techniques and materials may be utilized. The door is typically hingedly attached at the front of end wall 58, such as with a piano hinge or other conventional means, so that the door opens outwardly and away from the patch panel 22 as it swings through an angle ($\theta_{14}$) of approximately 90°. Door 40 preferably incorporate a latch for selectively securing the door in its closed position.

Raceway 34 can incorporate a vertically spaced series of cordage constraint brackets 64 for retaining cordage and cables within the raceway. Preferred embodiments of constrain bracket 64 incorporate an L-shaped member which extends from end wall 58 in a direction substantially parallel to back wall 56 and then extends substantially parallel to end wall 58 until they intersect and are mounted to back wall 56. So configured, the L-shaped portion of each bracket 64 cooperates with the end and back walls to limit the horizontal movement of the cables. In the embodiment shown in FIG. 3, however, each constrain bracket 64 is formed as a full rectangular shaped bracket which mounts within the raceway 34, although numerous other configurations also may be utilized.

It has been found that the width of upright 46 ($X_u$) should be approximately 3 inches for typical applications, thereby providing a vertical access channel 66 which is formed between the rear of patch panel 22 and the surface to which upright 46 is mounted of sufficient size to accommodate the passage of cables and/or cords therethrough. Additionally, each upright 46 can incorporate one or more passages (not shown) therethrough thereby providing additional access ports for cables and cords.

Figure 4:
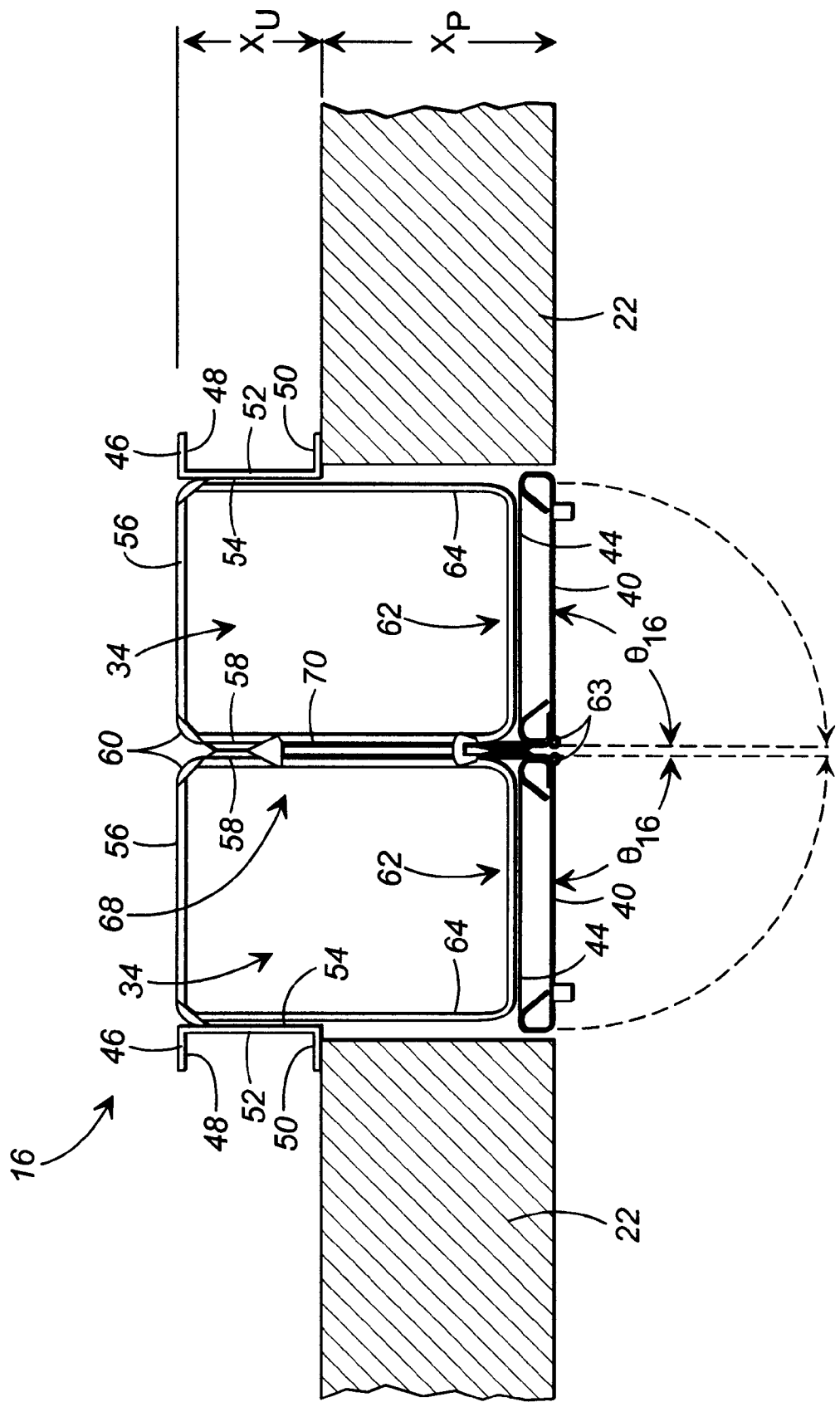
FIG. 4 is a partially cut-away, cross-sectional view of the embodiment of FIG. 2 taken along section line 4—4.

Referring now to FIG. 4, cross-section 4—4 of FIG. 2 will be described herein in detail and, in particular, the construction of a dual closet module 16 will be described. A dual closet module 16 is incorporated into a panel array 24 at a location where two modules of the panel system 10 meet in an abutting relationship. Dual closet module 16 is structurally supported by a pair of uprights 46 which are preferably formed as a length of C-channel beam. Uprights 46 typically are oriented so that their respective side walls 48 and 50 extend away from each other. As previously described in relation to the closet module 14A, when a dual closet module 16 is to be mounted to a mounting surface, such as a wall, mounting of the module is facilitated by fastening side walls 48 to the mounting surface.

Disposed between the uprights 46 are a pair of vertical raceways 34 oriented in side-by-side relationship, with each of the raceways 34 being bounded, at least in part, by side walls 54, back walls 56 and end walls 58. As shown in the dual closet module configuration, end walls 58 function as partitions, with the walls 58 preferably being fastened to one another by means, such as conventional fasteners, in order to maintain the side-by-side orientation of the raceways 34. Module 16 also can incorporate cordage constraint brackets 64 which can be attached to walls 54, 56 and/or 58. As shown in FIG. 4, end walls 58 preferably incorporate one or more passthrough openings 68 which are each sized and shaped for passing patch cords therethrough. Each passthrough opening 68 includes a grommet 70 formed of suitable insulating material for electrically isolating any patch cords passing through opening 68 from the side walls. Additionally, any joints formed between side walls 54 and back walls 56, and the joints formed between back walls 56 and end walls 58 can be reinforced by shaped gussets 60.

As previously described in relation to a closet module 14A (FIG. 3), preferred embodiments of the dual closet module 16 incorporate hinge mounted doors for normally closing one or more raceway openings 62 formed in the front of each of the raceways 34. Since the doors 40 are mounted in close proximity to one another, preferred embodiments of the dual closet module incorporate doors 40 which swing open toward each other and away from their respective patch panels 22 (i.e. through an angle $\theta_{16}$ of approximately 90°). Patch panels 22 are each attached to an upright 46, preferably by fastening to side wall 50 of each upright 46.

Figure 5:
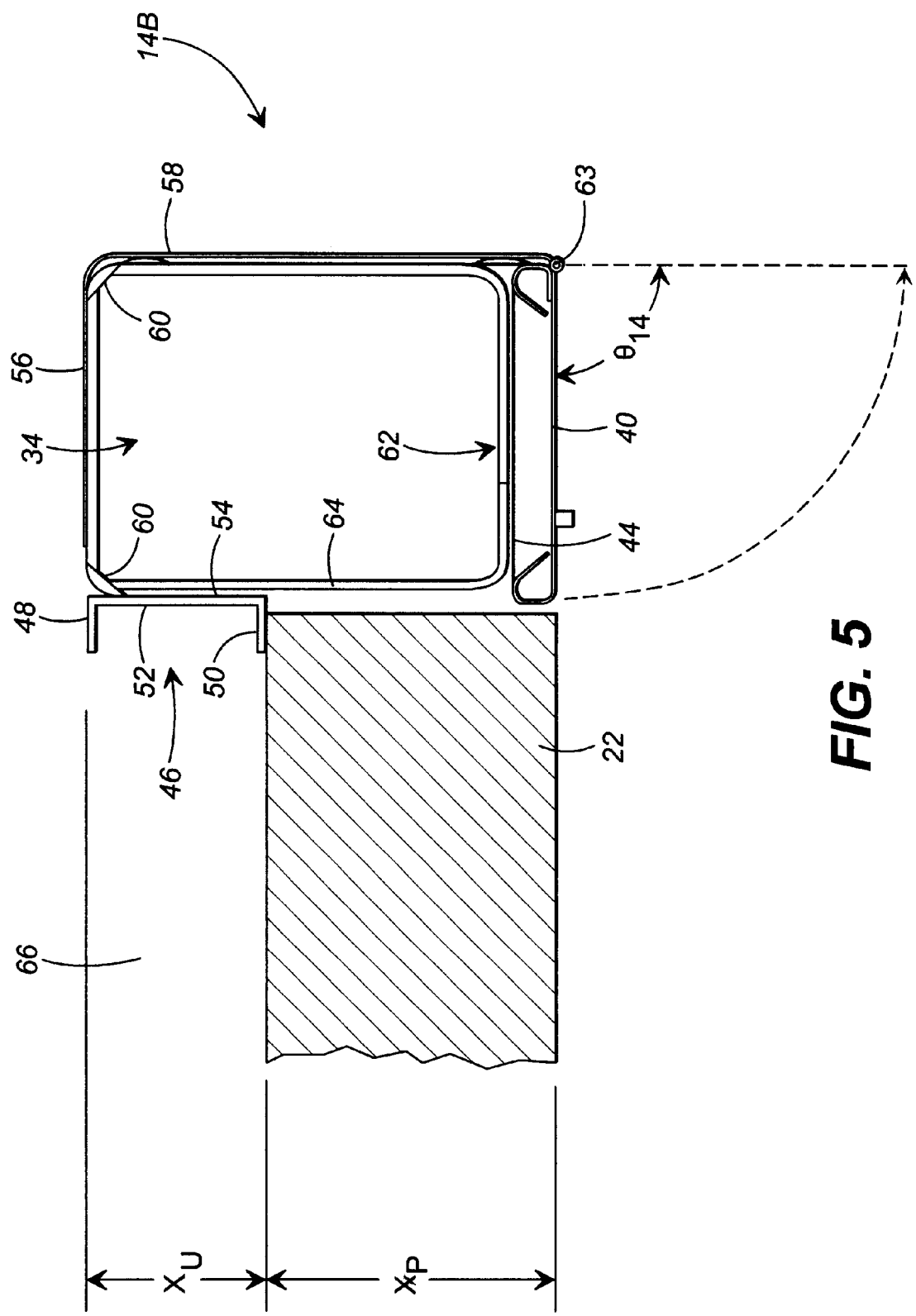
FIG. 5 is a partially cut-away, cross-sectional view of the embodiment of FIG. 2 taken along section line 5—5.

As shown in FIG. 5 (section 5—5 of FIG. 2), a closet module 14B is constructed virtually identically to the closet module 14A shown in FIG. 3; however, the module 14B is a mirror image of the module 14A. In an effort to promote efficient construction of the modular panel system 10, and in particular, an embodiment such as shown in FIG. 2, upright 46, side walls 54, back wall 56, end wall 58, door 40, and cordage restraint bracket 64 can be assembled prior to job sight installation. The aforementioned preassembled grouping of parts can then be arranged at the job site to form modules, such as module 14A, or the module may be inverted to form a module 14B.

As shown in FIGS. 2–5, the modular configuration of the patch panel system 10 should be readily apparent. For instance, when multiple patch panels are required for a particular application and the breadth of the mounting surface available for mounting the patch panels is sufficiently sized, a closet module 14, such as represented in FIG. 3, can be mounted to the mounting surface with the raceway 34 of the closet module 14 (e.g. a module 14A) being located toward the outermost edge of the mounting surface. A closet module 14B can then be attached to closet module 14A, thereby providing one or more patch panels for patching operations. If additional panels are required, a dual closet module 16 can be substituted for the module 14B, thereby providing additional uprights for supporting another set of patch panels 22. This process continues until the desired number of patch panels are assembled. In order to complete the array, a closet module 14B is attached to the patch panel at the distal end of the array. Additionally, for those applications that do not have a sufficient breadth of mounting surface for the aforementioned array of closet modules, two sets of arrays may be arranged in back-to-back relationship with each other, with pass-throughs formed therebetween for accommodating the passage of cords and/or cables therethrough, such that the uprights 46 and the back walls 56 of the respective modules are in close proximity to one another. Thus configured, the array can be freestanding, therefore, not requiring a wall or other similar mounting surface.

Figure 6:
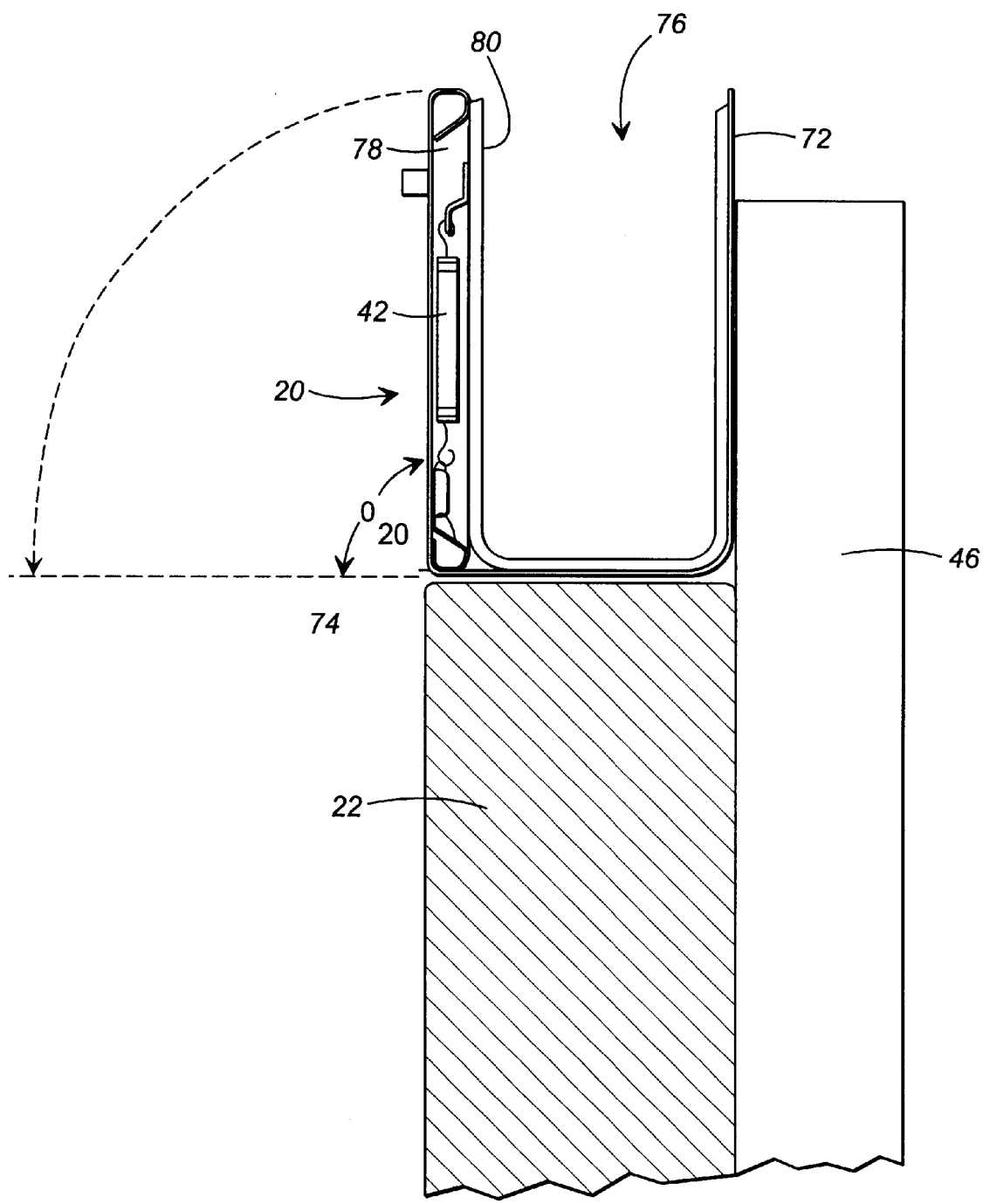
FIG. 6 is a partially cut-away, cross-sectional view of the embodiment of FIG. 2 taken along section line 6—6.

Referring now to FIG. 6, the construction details of a preferred embodiment of an upper trough module 20 may be seen. Upper trough module 20 is formed by back wall 72, bottom wall 74, and either by an end wall 58 of an adjacently disposed closet module 46 or the end wall 58 of an adjacent dual closet module 16. Back wall 72 is attached to upright 46 in a conventional manner, such as by mechanical fasteners, and typically is positioned so that bottom wall 74 is in close proximity to the top of patch panel 22. Trough 76 also can be bounded at the front of the module by a hinged door 78 which is preferably hinged along its lower edge so that the door opens downwardly away from the trough 76 and toward patch panel 22 (i.e. through an angle $\theta_{20}$ of approximately 90°). Door 78 also can incorporate a biasing member, such as spring tensioner 42, for biasing a door toward a closed position. Upper trough module 20 also can incorporate one or more cord retainers 80 preferably formed as a U-shaped support member which can be formed of steel, aluminum, etc. Cord retainers 80 assist in preventing cables from falling out of the trough when door 78 is in the open position because one of the upwardly extending portions of the U-shaped cord retainer extends upwardly from bottom wall 74 in the vicinity of the opening. Additionally, one end of the spring tensioner 42 can be fastened to a cord retainer 80 for biasing the door to the closed position. Furthermore, the top side of trough 76 typically is open to allow dressing of the patch cords into the trough without opening the door 78.

Figure 7:
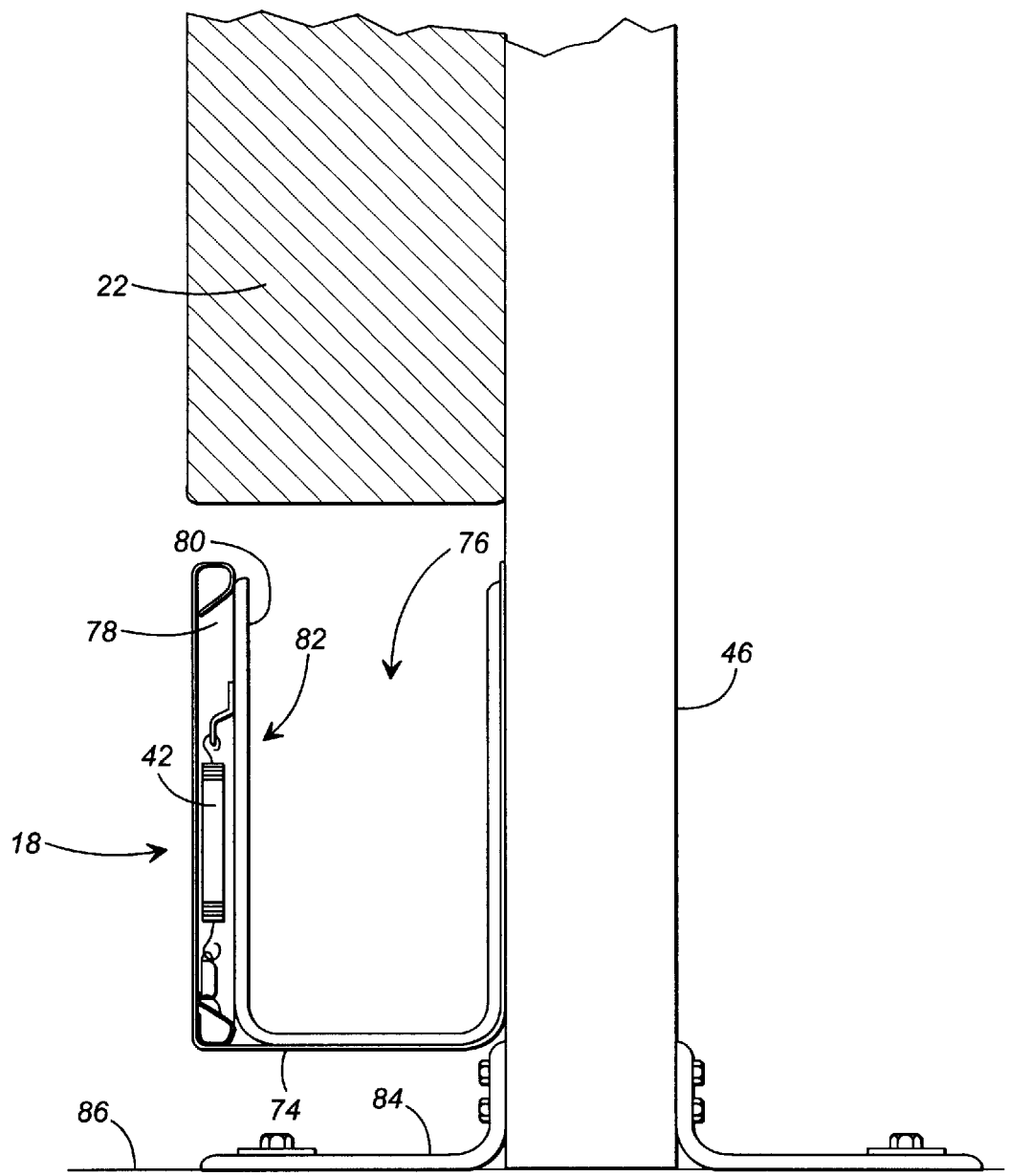
FIG. 7 is a partially cut-away, cross-sectional view of the embodiment of FIG. 2 taken along section line 7—7.
Figure 8:
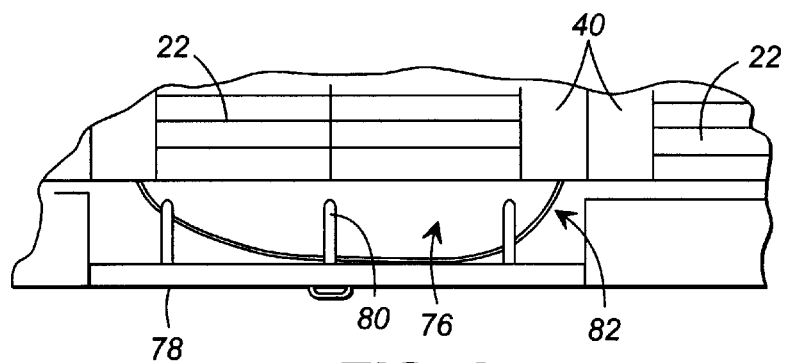
FIG. 8 is a partially cut-away, front view of the embodiment of FIG. 2 shown with the door of the lower trough module in an open position.

As shown in FIG. 7, a lower trough module 18 can be arranged below patch panel 22, thereby forming a trough 76 below the panel for cords to reside therein. Lower trough module 18 includes back wall 72 and bottom wall 74 which cooperate with door 78 to form the trough 76. Similarly configured to that of an upper trough module 20, as previously described, lower trough module 20 can incorporate one or more cord retainers 80, preferably formed in a U-shape for retaining cables within trough 76 when door 78 is pivoted to its open position. As shown in the preferred embodiment of FIG. 7, cord retainers 80 each have two upwardly extending segments with one of its segments engaging back wall 72 and the other of its upwardly extending segments cooperating with door 78. As in the preferred embodiment of the upper trough module 20, one end of spring tensioner 42 can be fastened to one of the segments of cord retainer 80. Additionally, lower trough module 18 does not necessarily abut the lower portion of patch panel 22. The lower trough module 18 can be fastened to upright 46 with a gap of various sizes formed between the lower end of patch panel 22 and the upper most portion of the lower trough module. Thus, patch cords may be dressed into the gap and, therefore, into the trough 76 without opening the door 78.

As should be understood by one of ordinary skill in the art, numerous configurations of rows of jacks and jack arrays may be incorporated into a patch panel depending upon the particular application, with each of the jacks configured to mate with a patch cord. All such configurations are suited for use with the present invention.

The foregoing description has been presented for purposes of illustration and is description. It is not intended to be exhaustive or to limit the invention to the precise forms disclosed. Obvious modifications or variations are possible in light of the above teachings. The embodiment discussed, however, was chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

I claim:

1. A patch panel modular cabinetry system for interconnecting transmission media, the transmission media including cables for delivering signals to and from a patch panel and patch cords for interconnecting at least some of the cables, said patch panel cabinetry system comprising:
   at least one patch panel having a plurality of jacks mounted thereto, each of said jacks configured to mate with a patch cord; and
   first and second closet modules, each of said closet modules having an upright member, a raceway, and an access channel, each of said upright members having first and second side walls, each of said first side walls having one of said patch panels attached thereto, each of said raceways formed adjacent at least one of said patch panels and sized and shaped to pass transmission media therethrough, each of said access channels formed between said first and second side walls of said access channel's respective upright and sized and shaped to pass transmission media therethrough and,
   wherein said second closet module has a side wall, a back wall, an end wall and a door, said side wall attached to said upright, said end wall and at least one of said patch panels cooperating to form an opening, said opening communicating with said raceway, said door hingedly attached to said end wall and moveable between an open and a closed position such that said door provides access to said opening in said open position.

2. The system of claim 1, wherein each of said upright members is formed of a length of C-channel beam.

3. A patch panel modular cabinetry system for interconnecting transmission media, the transmission media including cables for delivering signals to and from a patch panel and patch cords for interconnecting at least some of the cables, said patch panel cabinetry system comprising:
   at least one patch panel having a plurality of jacks mounted thereto, each of said jacks configured to mate with a patch cord;
   first and second closet modules, each of said closet modules having an upright member, a raceway, and an access channel, each of said upright members having first and second side walls, each of said first side walls having one of said patch panels attached thereto, each of said raceways formed adjacent at least one of said patch panels and sized and shaped to pass transmission media therethrough, each of said access channels formed between said first and second side walls of said access channel's respective upright and sized and shaped to pass transmission media therethrough; and
   an upper closet module having a bottom wall and a back wall extending upwardly therefrom, said back wall attached to said first side walls of the uprights of said first and second closet modules such that said upper closet module is disposed above said patch panels, said bottom wall and said back wall forming a trough, said trough sized and shaped for passing transmission media therethrough.

4. The system of claim 3, wherein said upper closet module has a cordage constraint bracket, at least a portion of said cordage constraint bracket extending upwardly from said bottom wall and spaced from said back wall such that transmission media pass between said portion of said cordage constraint bracket and said back wall.

5. The system of claim 3, wherein said upper closet module has an opening and a door, said opening communicating with said trough, said door hingedly attached to said bottom wall and moveable between an open and a closed position such that said door provides access to said opening in said open position.

6. The system of claim 5, wherein said door is biased to said closed position by a spring, said spring being attached to said cordage constraint bracket.

7. The system of claim 3, wherein each of said upright members is formed of a length of C-channel beam.

8. A patch panel modular cabinetry system for interconnecting transmission media, the transmission media including cables for delivering signals to and from a patch panel and patch cords for interconnecting at least some of the cables, said patch panel cabinetry system comprising:

at least one patch panel having a plurality of jacks mounted thereto, each of said jacks configured to mate with a patch cord;

first and second closet modules, each of said closet modules having an upright member, a raceway, and an access channel, each of said upright members having first and second side walls, each of said first side walls having one of said patch panels attached thereto, each of said raceways formed adjacent at least one of said patch panels and sized and shaped to pass transmission media therethrough, each of said access channels formed between said first and second side walls of said access channel's respective upright and sized and shaped to pass transmission media therethrough; and a lower closet module having a bottom wall and a back wall extending upwardly therefrom, said back wall attached to said first side walls of the uprights of said first and second closet modules such that said lower closet module is disposed below said patch panels, said bottom wall and said back wall forming a trough, said trough sized and shaped for passing transmission media therethrough.

9. The system of claim 8, further comprising a third closet module, said third closet module having first and second uprights, and first and second raceways, said third closet module disposed between said first and second closet modules such that the upright of said first closet module and the first upright of said third closet module form a third access channel, and the upright of said second closet module and the second upright of said third closet module form a fourth access channel.

10. The system of claim 8, wherein said lower closet module has a cordage constraint bracket, at least a portion of said cordage constraint bracket extending upwardly from said bottom wall and spaced from said back wall such that transmission media pass between said portion of said cordage constraint bracket and said back wall.

11. A patch panel modular cabinetry system for interconnecting transmission media, the transmission media including cables for delivering signals to and from a patch panel and patch cords for interconnecting at least some of the cables, said patch panel cabinetry system comprising:

at least one patch panel having a plurality of jacks mounted thereto, each of said jacks configured to mate with a patch cord;

first and second closet modules, each of said closet modules having an upright member, a raceway, and an access channel, each of said upright members having first and second side walls, each of said first side walls having one of said patch panels attached thereto, each of said raceways formed adjacent at least one of said patch panels and sized and shaped to pass transmission media therethrough, each of said access channels formed between said first and second side walls of said access channel's respective upright and sized and shaped to pass transmission media therethrough;

an upper closet module having a bottom wall and a back wall extending upwardly therefrom, said back wall attached to said first side walls of the uprights of said first and second closet modules such that said upper closet module is disposed above said patch panels, said bottom wall and said back wall forming a trough, said trough sized and shaped for passing transmission media therethrough; and a lower closet module having a bottom wall and a back wall extending upwardly therefrom, said back wall attached to said first side walls of the uprights of said first and second closet modules such that said lower closet module is disposed below said patch panels, said bottom wall and said back wall forming a trough, said trough sized and shaped for passing transmission media therethrough;

said first and second closet modules extending above said patch panels with said upper closet module disposed therebetween, said lower closet module laterally extending beyond said patch panels with said first and second closet modules disposed thereabove.

12. The system of claim 11, further comprising a third closet module, said third closet module having first and second uprights, and first and second raceways, said third closet module disposed between said first and second closet modules such that the upright of said first closet module and the first upright of said third closet module form a third access channel, and the upright of said second closet module and the second upright of said third closet module form a fourth access channel.

* * * * *